(12) United States Patent  
Signer et al.

(10) Patent No.: US 9,776,370 B2  
(45) Date of Patent: Oct. 3, 2017

(54) PELLET PRESS

(75) Inventors: Walter Signer, Bazenheid (CH); Roger Räss, Gossau (CH); Andrea Hermsmeyer, Oberuzwil (CH)

(73) Assignee: Bühler AG, Uzwil (CH)

( * ) Notice: Subject to any disclaimer, the term of this patent is extended or adjusted under 35 U.S.C. 154(b) by 330 days.

(21) Appl. No.: 13/579,778

(22) PCT Filed: Feb. 18, 2011

(86) PCT No.: PCT/EP2011/052392  
§ 371 (c)(1),  
(2), (4) Date: Aug. 17, 2012

(87) PCT Pub. No.: WO2011/101432  
PCT Pub. Date: Aug. 25, 2011

(65) Prior Publication Data  
US 2012/0313277 A1    Dec. 13, 2012

Related U.S. Application Data

(60) Provisional application No. 61/305,699, filed on Feb. 18, 2010.

(51) Int. Cl.
| | |
|---|---|
| *B30B 11/20* | (2006.01) |
| *B01J 2/22* | (2006.01) |
| *B30B 11/22* | (2006.01) |
| *B30B 15/00* | (2006.01) |
| *B30B 11/00* | (2006.01) |

(52) U.S. Cl.  
CPC .............. *B30B 11/201* (2013.01); *B01J 2/22* (2013.01); *B30B 11/227* (2013.01); *B30B 15/0023* (2013.01); *B30B 15/0082* (2013.01); *B30B 11/005* (2013.01); *B30B 11/006* (2013.01); *B30B 11/20* (2013.01); *B30B 11/202* (2013.01);  
(Continued)

(58) Field of Classification Search  
CPC ..... B30B 11/20; B30B 11/201; B30B 11/202; B30B 11/207; B30B 11/208; B30B 11/005; B30B 11/006; B30B 15/0023; Y10S 425/23; B01J 2/22  
USPC ......... 425/331, 374, 365, 73, 151, 289, 294, 425/DIG. 113, DIG. 230, 136, 138, 150  
See application file for complete search history.

(56) References Cited

U.S. PATENT DOCUMENTS 2,128,651 A * 8/1938 Kohler .......................... 425/210  
2,167,900 A * 8/1939 Meakin ......................... 425/168  
(Continued)

FOREIGN PATENT DOCUMENTS

| CH | 347606 | 7/1960 |
| CN | 101332683 | 12/2008 |

(Continued)

*Primary Examiner* — Seyed Masoud Malekzadeh  
(74) *Attorney, Agent, or Firm* — Davis & Bujold PLLC; Michael J. Bujold

(57) ABSTRACT

A pellet press having a motor with a motor housing and a rotor arranged rotatably in the housing. The rotor is a hollow shaft. A pressing mechanism has a pressing mold and pressing rolls arranged in the pressing mold. The rolls are fastened to a stationary shaft. The stationary shaft is arranged in the rotor designed as the hollow shaft. A mold holder is operationally connected to the pressing mold. The mold holder and the rotor are connected to each other by a shaft-hub connection such that a transmission of a torque of the rotor to the mold holder is ensured.

17 Claims, 7 Drawing Sheets

(52) U.S. Cl.
CPC .......... *B30B 11/207* (2013.01); *B30B 11/208* (2013.01); *Y10S 425/23* (2013.01)

(56) References Cited

U.S. PATENT DOCUMENTS

| | | | |
|---|---|---|---|
| 2,174,141 A | | 9/1939 | Sizer |
| 2,183,196 A | * | 12/1939 | Kohler ........................ 425/289 |
| 2,295,743 A | * | 9/1942 | Meakin ................ B30B 11/201 425/306 |
| 2,412,299 A | * | 12/1946 | Snow ........................... 425/365 |
| 2,764,951 A | * | 10/1956 | Fisher ........................ 425/331 |
| 3,167,033 A | * | 1/1965 | Reinhard .................... 425/192 R |
| 3,841,817 A | * | 10/1974 | Moldenhauer et al. ...... 425/331 |
| 3,981,664 A | * | 9/1976 | Bittner et al. ................ 425/331 |
| 4,053,266 A | * | 10/1977 | Friedrichs et al. ............ 425/73 |
| 4,238,432 A | * | 12/1980 | Henderson et al. ......... 264/40.7 |
| 4,293,295 A | * | 10/1981 | van Deuren ................ 425/331 |
| 4,711,622 A | * | 12/1987 | Schaffner .................... 425/331 |
| 4,741,264 A | * | 5/1988 | McPeak ................ A23L 1/0151 366/318 |
| 4,770,621 A | * | 9/1988 | Groebli et al. ............... 425/150 |
| 4,817,517 A | * | 4/1989 | Ammann et al. ................ 99/483 |
| 5,251,545 A | * | 10/1993 | Wetzel ........................... 100/41 |
| 5,585,124 A | * | 12/1996 | Bittner ........................ 425/331 |
| 2005/0163641 A1 * | | 7/2005 | Schunk ............... B29C 45/5008 417/572 |

FOREIGN PATENT DOCUMENTS

| | | |
|---|---|---|
| EP | 0462705 | 12/1991 |
| EP | 0635344 | 1/1995 |
| EP | 0773101 | 5/1997 |
| EP | 1039210 | 9/2000 |
| GB | 1471702 | 4/1977 |
| JP | 54072261 | 6/1979 |
| JP | 59123615 | 7/1984 |

* cited by examiner

PELLET PRESS

This application is a National Stage completion of application no. PCT/EP2011/052392 filed Feb. 18, 2011, which claims the benefit of provisional application No. 61/305,699 filed Feb. 18, 2010.

FIELD OF THE INVENTION

The present invention relates to a motor for a pellet press, a pellet press, a method for safe shutdown, an arrangement for safe shutdown, a door lock, a feed chute for a pellet press, a cutting knife for a pellet press, and a device for changing rolls and molds.

BACKGROUND OF THE INVENTION

Motors for driving pellet presses, pellet presses, door locks and feed chutes for pellet presses are known from the prior art. The pellet presses are used for example to compress animal feed or woodchips into "pellets" having a wide range of shapes. These presses are generally driven by complicated belt drives, which have external motors and are susceptible to failure. In addition, the pellet presses have complex door locks so as to prevent access to rotating and/or moving parts. Known feed chutes have the disadvantage that the feed to the antechamber of the press is discontinuous and irregular.

SUMMARY OF THE INVENTION

The object of the invention is to overcome the disadvantages of the prior art.

This object is achieved by the devices and methods defined in the independent claims. Further embodiments are disclosed in the dependent claims.

A first object of the present invention is to transfer a high torque of a motor shaft to a component arranged downstream of the shaft. This object is achieved with the device described below.

A motor according to the invention has a shaft which is formed as a hollow shaft. At its end, the shaft has a toothing in the longitudinal direction, which can form a spline together with a complementary toothing of a hub formed correspondingly. It goes without saying that the toothing on the shaft is arranged outside the motor housing or can at least be connected from the outside. In particular, such a spline enables simple replacement of the hub, since the hub can be slid onto the shaft and immediately forms a positive fit with the shaft. As a result of suitable design of the spline, an optimal transfer of torque can thus be ensured in an area which is very restricted in terms of space. In particular, a greater torque can be transferred than is possible with a conventional flange/screw connection of comparative size. In this case and also hereinafter, the end of the shaft does not mean the absolute end of the shaft, but an end region of the shaft. For example, it is thus conceivable that, proceeding from the motor housing, a short shaft piece of up to 20 cm joins after the toothing so that the shaft can again receive a bearing.

The toothing of the shaft may have straight sided flanks, serration flanks or involute flanks. The toothing preferably has involute flanks. It has been found that a spline having involute flanks enables maximum torque transfer.

A further object of the present invention lies in transferring a high torque of a drive of a pellet press, in particular of a direct drive of a pellet press, to a mold holder. This object is achieved with the pellet press described below.

A pellet press according to the invention has a motor, in particular as described above, with a motor housing and a rotor arranged rotatably therein. The rotor is formed as a hollow shaft. In addition, the pellet press has a pressing unit with a pressing mold and pressing devices arranged in this pressing mold, in particular pressing carriages and/or pressing rolls. The pressing devices are fixed to a stationary shaft. The stationary shaft is arranged in the rotor of the motor, said rotor being formed as a hollow shaft. The pressing unit also has a mold holder operatively connected to the pressing mold. The mold holder of the pressing unit and the rotor of the motor are interconnected by means of a connection means so that a torque of the rotor is transferred to the mold holder. The connection means is a shaft/hub connection in this case. A shaft/hub connection can be much smaller than a known flange/screw connection, and this connection can therefore also be used in the tightest of spaces.

The shaft/hub connection may be provided in the form of a spline, in particular with straight sided flanks, serration flanks or involute flanks. A preferred embodiment has involute flanks, in particular in accordance with DIN 5480-N, since this enables maximum torque transfer.

A further object of the present invention lies in covering a pellet press in operation, in particular the rotating or moving parts thereof, and simultaneously allowing easy access, even in tight spaces. This object is achieved with the pellet press described below.

A further pellet press according to the invention, in particular as described above, has a motor with a motor housing, a rotating pressing unit and a protective housing covering the pressing unit and/or the motor. The protective housing has a press door, which allows access to the pressing unit. The press door is designed in the form of a sliding door so that the press unit can be easily accessed, even in the tightest of spaces. Since the press door is designed as a sliding door, only very little space is required to open the door, and therefore the pellet press can be placed close to further equipment in a factory building. The protective housing is preferably designed in such a way that the press door can be slid into the interior of the protective housing or so as to lie directly on the outside against the protective housing. The protective housing may also be formed completely by sliding doors, which for example allows free access to the motor and in particular to the motor wiring.

A pellet press comprising a feed channel may have an inspection flap arranged in the feed channel, said flap being used for example to examine the quality of the material to be fed to the pellet press. Such an inspection flap comprises a front cover and two side panels. These side panels can be inserted into correspondingly designed slits in the feed channel. The side panels may thus have "side panel tabs", which prevent the inspection flap from falling out. In addition, the side panel tabs may be of a weight which causes the inspection flap to close independently. The side panels preferably have a notch in their lower edge close to the front cover, said notch forming a simple hinge together with the corresponding slit in the feed channel. The side panel flaps form a stop for the side panel when the inspection flap is opened so that the inspection flap is prevented from falling out. The inspection flap is preferably of a width which corresponds approximately to the width of the feed channel. The side panels can thus be arranged close to the edge inside the feed channel so that the material flow in the feed channel is only marginally impeded.

A further object of the present invention lies in providing a method and an arrangement which allow safe shutdown, even in an environment where there is a risk of explosion. This object is achieved With the method and by the arrangement described below.

A method according to the invention for safe shutdown of an electric circuit, in particular of a pellet press as described above, comprises the following sequential steps:
a) detecting a movement of a shaft of a machine, said shaft being stationary during normal operation,
b) switching an electrical connection between the stationary shaft and the machine so as to be floating,
c) disconnecting the electrical connection.

In this method, it is advantageous for the movement of the shaft of the machine, said shaft being stationary during normal operation, to be detected as early as possible. A corresponding detector is thus to be designed so as to be accordingly sensitive. It goes without saying that not only can the movement of the stationary shaft be detected, but also the movement of a lever arranged on the shaft, thus further improving the level of sensitivity. A detected movement of the shaft, which is stationary during normal operation, can be transmitted via corresponding signals to a control unit, which switches existing electrical connections between the shaft and the machine so as to be floating. For example, electrical connections may be sensor cables, which are to be guided along the shaft inside the machine. Alternatively, control lines or lines for voltage or current supplies can also be used however. Since the electrical connections are switched so as to be floating, these connections can be disconnected safely. Sparking is prevented, which is advantageous in particular in environments where there is a risk of explosion.

An arrangement according to the invention for safe shutdown of an electric circuit of a machine, in particular of a pellet press as described above, comprises a detector for detecting a movement of a shaft of the machine, said shaft being stationary during normal operation, and a means for switching an electrical connection between the stationary shaft and the machine so as to be floating. In addition, the arrangement comprises a device for disconnecting the electrical connection. The device is designed such that the electrical connection is only disconnected after having been switched so as to be floating. A sensitive detector can ensure that the movement of the shaft is detected as early as possible. For example, a lever may be arranged on the shaft and amplifies the movement of the shaft. Detection of movement of the shaft is thus simplified. The selection of a sensitive detector can be combined with a corresponding design of the lever.

Irrespective of the abovementioned method and arrangement for safe shutdown, an overpressure can be applied to the motor chamber, or chamber formed by a protective housing covering the motor, of a pellet press. If the air required for the overpressure is filtered accordingly, this overpressure can ensure that no concentration of dust, which is at risk of explosion, is found in this chamber. In particular, dust from the pressing chamber can be prevented from infiltrating this chamber. Such an arrangement is advantageous in particular with respect to the ATEX Guidelines of the European Union or similar guidelines. An overpressure is understood in particular to mean a pressure that is greater than the atmospheric pressure of the surrounding environment, in particular greater than the pressure in the pressing chamber of the pellet press. The difference in pressure between the protective housing and the pressing chamber and/or between the protective housing and the ambient pressure is at least 10 Pa, preferably at least 20 Pa, more preferably at least 30 Pa.

A further object of the present invention lies in providing a feed chute for a pellet press, said chute being of simple design and allowing a precise feed to the antechamber of the press. This object is achieved with the feed chute of a pellet press described below.

With intended use, a feed chute according to the invention of a pellet press, in particular as described above, for feeding material to be pelletized to an antechamber of the pellet press has a convexity, in particular in the end region of the feed chute, transverse to the direction in which the material to be pelletized falls, or has a sharp bend approximately in the middle of the product flow along the direction of fall. It goes without saying that the convexity or sharp bend has to be directed downward with use as intended. In this case, a convexity is understood to mean that the feed chute has a continuous deflection transverse to the intended direction of transport, and in particular has no sharp bends. Accordingly, a section through the feed chute transverse to the direction of fall of the material to be pelletized with use as intended is approximately U-shaped or V-shaped. As a result of a feed chute designed in this way, it can be ensured that material can always be fed selectively to a specific point, irrespective of the amount of material to be fed. In order to additionally focus the material to be fed towards a point to be reached, the feed chute may be reduced in cross section in the direction of the end region. This is advantageous in particular with feed chutes having a convexity, that is to say a trough-shaped or U-shaped chute.

A further object of the present invention lies in providing an advantageous feed chute, which is optimized in terms of force, having a bypass position. This object is achieved with a feed chute described below.

A feed chute according to the invention for a pellet press, it being possible to use said feed chute alone or in combination with a pellet press described above or with the above-described feed chute, is used to feed material to be pelletized into an antechamber of a pellet press through an opening. The feed chute is arranged in a feed channel of the pellet press and on a hinge joint so that the feed chute can be pivoted from a first position into a bypass position. In the first position, the feed chute guides the material conveyed through the feed channel into the antechamber of the pellet press. In the bypass position, the opening to the antechamber of the press is closed by the feed chute so that the material from the feed channel bypasses this opening. The hinge joint is arranged in this case in the middle third in relation to the longitudinal extent in the direction of fall of the feed chute. Due to the approximately central arrangement of the hinge joint, only a fraction of the force required in the case of a conventional arrangement of the hinge joint at the edge is required for pivoting. It goes without saying that in such an arrangement the hinge joint is also located approximately centrally in the feed channel. A corresponding holder for receiving the hinge joint in the feed channel can be achieved for example by means of a continuous rod, which extends transversely through the feed channel. Such a rod also allows simple pivoting of the feed chute from outside the feed channel. It goes without saying that other fixing options are also conceivable, in particular shaft stubs which are arranged on either side of the feed chute and enable a rotary connection to the feed channel. The material flow in the bypass position therefore is not impeded unnecessarily.

A further object of the present invention lies in providing a door lock, in particular for a pellet press, said door lock ensuring that a door can only be opened if the shaft is vertical. This object is achieved with the device described below.

A door lock according to the invention for a pellet press, in particular as described above, with a motor and a shaft comprises a mechanical locking means and an electromechanical locking means. The mechanical locking means is blocked by the electromechanical locking means if the shaft of the motor of the pellet press is turning or is not yet still. It goes without saying that the rotary movement of the shaft therefore has to be monitored. Solutions for this purpose are known to a person skilled in the art and this is therefore not explained in greater detail. For example, the mechanical locking means may be a conventional bolt, which engages in a complementary recess. Other mechanical locking means are also conceivable. The electromechanical locking means may be an electromagnet for example, which blocks the mechanical locking means, for example the bolt, by its magnetic force and releases it again as necessary. For example, an electromechanical locking means is also understood to be a servomotor. For example, such a servomotor can block the movement of the mechanical locking means and release it again by means of a pin. Automatic locking can also be implemented by a pin which is biased by means of a spring. For example, this pin can then be moved out of the locked position by an electromagnet or a servomotor. The locking provided by the pin therefore has to be actively released. Such an automatic locking has the advantage of ensuring that the door is always locked, even if a supply voltage for the electromagnet or the servomotor is lost. Due to the use of the electric locking means, it can be ensured that a protective cover or a door for maintenance purposes can only be opened if the pellet press has stopped or if the shaft thereof is no longer turning. A risk of injury caused by rotating and/or moving parts is therefore ruled out.

The door lock may comprise a detector for detecting the state of the mechanical locking means. For example, it can thus be ensured that the motor of the pellet press can only be operated if the door lock is correctly closed or if the mechanical locking means is closed and/or is blocked by the electric locking means. It goes without saying that the detector has to be connected to a corresponding circuit of the pellet press. The detector can be a separate component or can be integrated directly in the electric locking means.

A pellet press according to the invention has a door and a door lock, as described above. Provided the mechanical locking means is still open or is not blocked by the electric locking means, the motor of the pellet press is locked.

A further object of the present invention lies in providing a cutting knife for a pellet press, said cutting knife indicating excessive wear and in particular timely replacement. This object is achieved with a cutting knife described below.

A cutting knife according to the invention for a pellet press, for example for a pellet press as described above, has a knife base and at least one blade having a cutting edge. The blade has a wear indicator, which indicates the wear of the blade. With intended use, the cutting knife is guided over the pressing mold of the pellet press and cuts the compressed material by means of its blade, said pressed material having been pressed out from the holes in the pressing mold to form pellets. It goes without saying that the blade becomes worn during such cutting operations. Before, an operator was only able with difficulty to quantify the wear of the blade and accordingly schedule the replacement of the cutting knife. Due to the wear indicator on the blade however, an operator can easily identify whether the cutting knife can still be used or has to be changed. In the case of cutting knives having two blades, the second blade can also be used where necessary if the first blade is worn, so that the cutting knife does not have to be replaced until later.

The wear indicator can be formed by an obtuse angle of between 105° and 175°, preferably between 120° and 160°, more preferably between 135° and 145°, between the blade and the base of the knife. Naturally, this angle is arranged on an outer face of the cutting knife, that is to say on the side facing away from the pressing mold with use as intended. It is equally conceivable for the wear indicator to be formed by a notch, a lip, or by a purely visual marking, for example a laser engraving.

A further object of the present invention lies in providing a device for changing rolls and molds in a simple manner.

A device according to the invention for changing rolls and molds of a pellet press, in particular of a pellet press as described above, has at least one beam with a traveling crane and at least one support element for support at the base. The beam is fixed, or can be fixed, on one side to the support element and on the other side directly to the pellet press by means of a support. As a result of this construction with a support element and support directly on the pellet press, it is possible to dispense with a complex mechanism. In addition, not every individual pellet press has to have its own changeover device, but a single device can be used for a number of pellet presses. In particular if the height at which the beam is fixed to the support element can be changed, pellet presses having different pressing mold diameters and pellet presses of different dimensions can also be provided with the same device for changing rolls or molds.

The support can be fixed, or fixable, to a front plate of the pellet press. Modern pellet presses are designed with very robust front plates, since these front plates carry the entire weight of the pressing mold, of the pressing rolls and of the motor. A support of the beam on the front plate therefore involves not only the necessary bad uptake, but also the stability required for changing a roll or mold. The support may be an adapter, which ensures reliable connection between the beam and the front plate.

A direct drive pellet press according to the invention including an electric motor having a motor rotor which are housed within a motor housing. The motor rotor is rotatably arranged within the motor housing so as to rotate about an axis and is formed as a hollow shaft. A pressing unit having a pressing mold and pressing devices. The pressing devices are arranged in said pressing mold. The pressing devices are fixed to a stationary shaft so as to prevent relative rotation between the pressing devices and the stationary shaft. The stationary shaft axially extends within said motor rotor. A mold holder is operatively connected to the pressing mold, and said mold holder has a first element of a spline connection and said motor rotor has a second element of the spline connection. The first element of the spline connection directly meshes with the second element of the spline connection so that a torque of the motor rotor is transferred from the motor rotor directly to the mold holder.

BRIEF DESCRIPTION OF THE DRAWINGS

The invention will be explained in greater detail hereinafter on the basis of figures illustrating embodiments, which are merely exemplary, and in which.

DETAILED DESCRIPTION OF THE PREFERRED EMBODIMENTS

Figure 1:
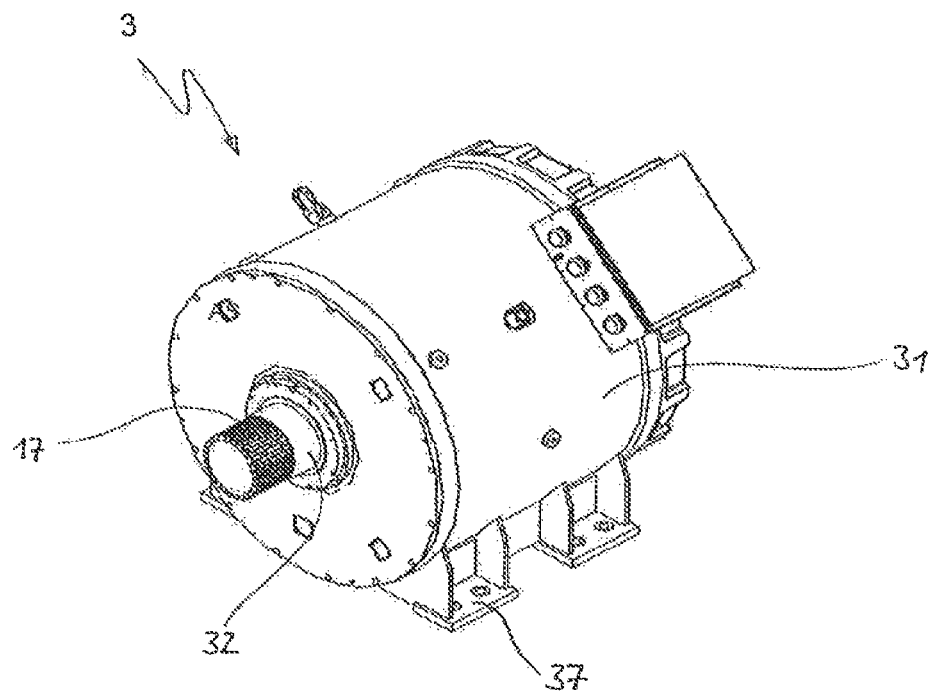
FIG. 1: shows a view of a motor according to the invention.

FIG. 1 shows a view of a motor 3 according to the invention with its motor housing 31 and a shaft 32 designed as a hollow shaft. The end of the shaft 32 has a toothing 17, which can form a spline together with a complementary toothing 18 (see FIG. 2) of a hub. The toothing shown has involute flanks.

Figure 2:
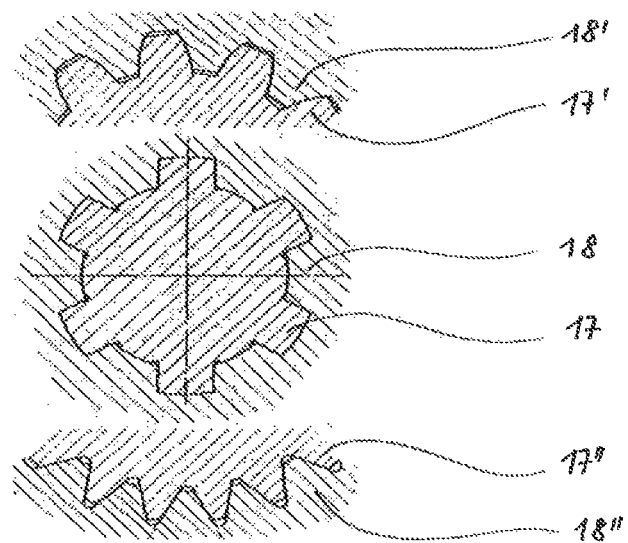
FIG. 2: shows a schematic illustration of different splines.

FIG. 2 shows a schematic illustration of different splines. A spline having straight sided flanks is arranged in the middle, wherein a shaft having the toothing 17 is illustrated fully in cross section and a hub with its toothing 18 is illustrated merely in part.

A further shaft with toothing 17' with a complementary hub with toothing 18' is illustrated merely in part. The toothings 17', 18' have involute flanks.

A third shaft with toothing 17" with a complementary hub with toothing 18" is likewise illustrated merely in part. The toothings 17", 18" have serration flanks.

Figure 3:
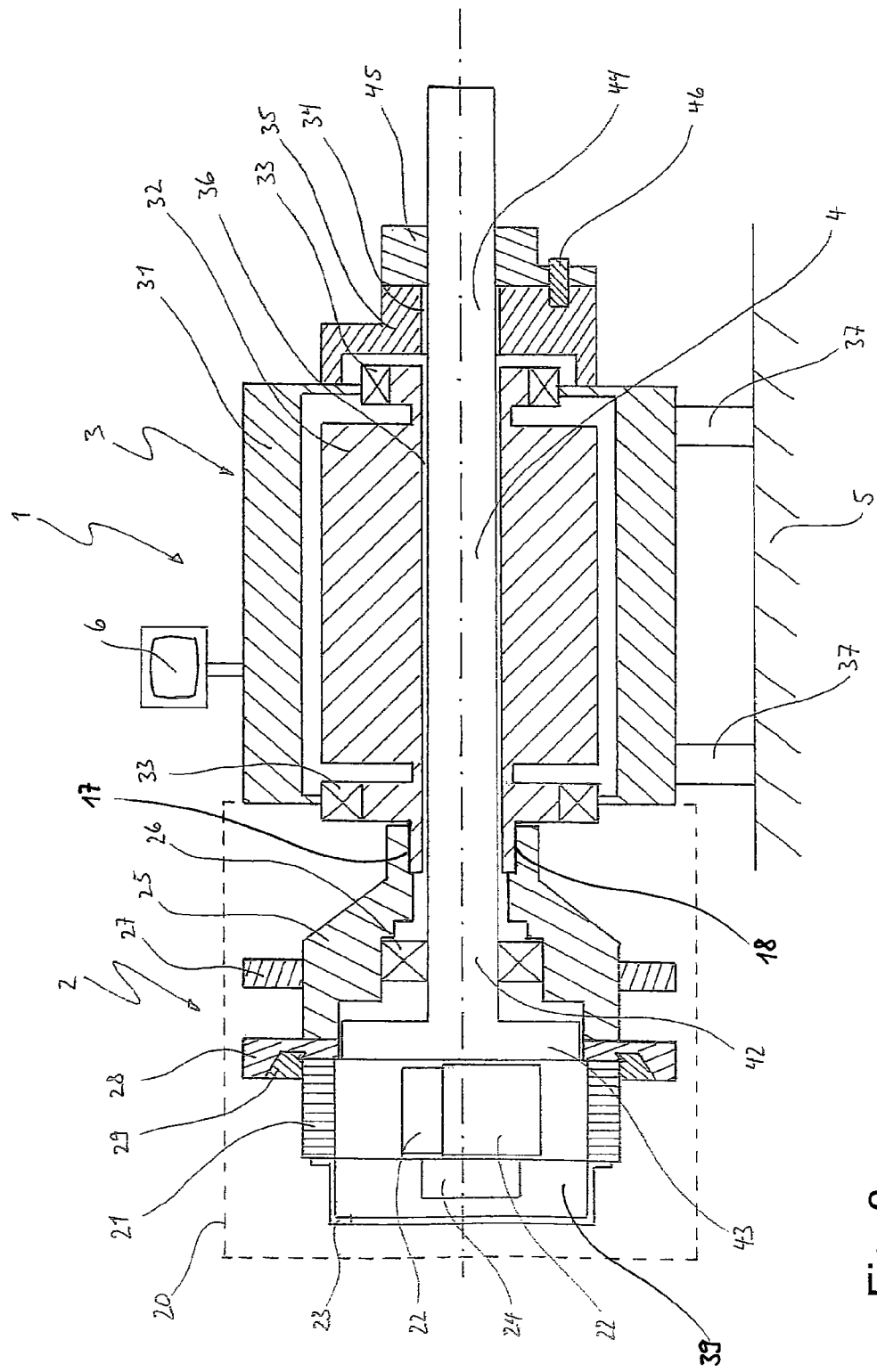
FIG. 3: shows a schematic illustration of a pellet press according to the invention in a first embodiment.

FIG. 3 shows a schematic illustration of a pellet press 1 according to the invention. The pellet press 1 consists basically of a pressing unit 2 and a motor 3.

The pressing unit 2 comprises a pressing mold 21, which is received by a mold holder 25. The pressing mold 21 is fixed in a known manner by means of clamping segments 29 to a support ring 28, which is located on the mold holder 25. For simplified removal of the pressing mold 21 from the mold holder 25 or from the support ring 28, an air cushion element 27 is used in a known manner. The air cushion element 27 is merely suggested. Alternatively, the pressing mold 21, support ring 28 and mold holder 25 can be screwed directly.

Two pressing rolls 22 are arranged in the pressing mold 21 and press the material to be pelletized through holes in the rotating pressing mold 21. The pressing rolls 22 are fixed to a pressing chamber disk 43 at a front end 42 of a stationary shaft 4. The stationary shaft 4 is supported at its front end 42 by a shaft bearing 26 in the mold holder 25. Due to the roll adjuster 24, the press rolls 22, and in particular the distance thereof from the pressing mold 21, can be adjusted manually or automatically, before and/or during operation.

A shaped lid 23 with an opening allows the introduction of material to be pelletized into the antechamber 39 of the press. A press door 20 can close the pressing unit 2 so that there is no risk of injury to individuals working in the area surrounding the pellet press 1.

The motor 3 corresponds substantially to a conventional three-phase synchronous motor and has a motor housing 31, which receives a rotor 32. The rotor 32 is mounted inside the motor housing 31 by means of two motor bearings 33 so that it can be easily rotated. The rotor 32 has a central bore 36, through which the static shaft 4 is passed. The motor 3 is provided at its end opposite the pressing unit 2 with a cover plate 35, which has an opening for fixing an auxiliary bearing 34 and, mounted therein, the stationary shaft 4. The auxiliary bearing is formed as a sliding bearing and consists of a brass or bronze sleeve. Other materials are likewise conceivable. The cover plate 35 prevents the infiltration of dust and dirt into the inner chamber of the motor. The motor housing 31 has feet 37 on its underside, with which the motor 3 and therefore the pellet press 1 can be installed on the ground or on a base plate 5.

The pressing unit 2 is connected directly via the mold holder 25 to the motor 3 or to the rotor 32 of the motor 3. The mold holder 25 is connected via a spline 17, 18 to the rotor 32. The toothings 17, 18 of the mold holder 25 and of the rotor 32 are formed with involute flanks. As a result of this spline 17, 18, complicated connection means or V-belts are no longer necessary. In particular, high torques can thus be transferred. In addition, the motor bearing 33 is thus easily accessible for maintenance purposes. The mold holder 25 can be adapted to different pressing molds 21 by means of different support rings 28 and corresponding clamping segments 29.

A pin holder 45 is fixed to the central shaft 4. A shear pin 46 connects the pin holder to the cover plate 35 of the motor 3. Alternatively, the shear pin 46 may also be connected directly to the stationary shaft 4 and may engage in a correspondingly designed cover plate 35 of the motor 3. It is likewise conceivable to place the shear pin 46 between a pin holder 45 and a base plate 5.

Figure 4:
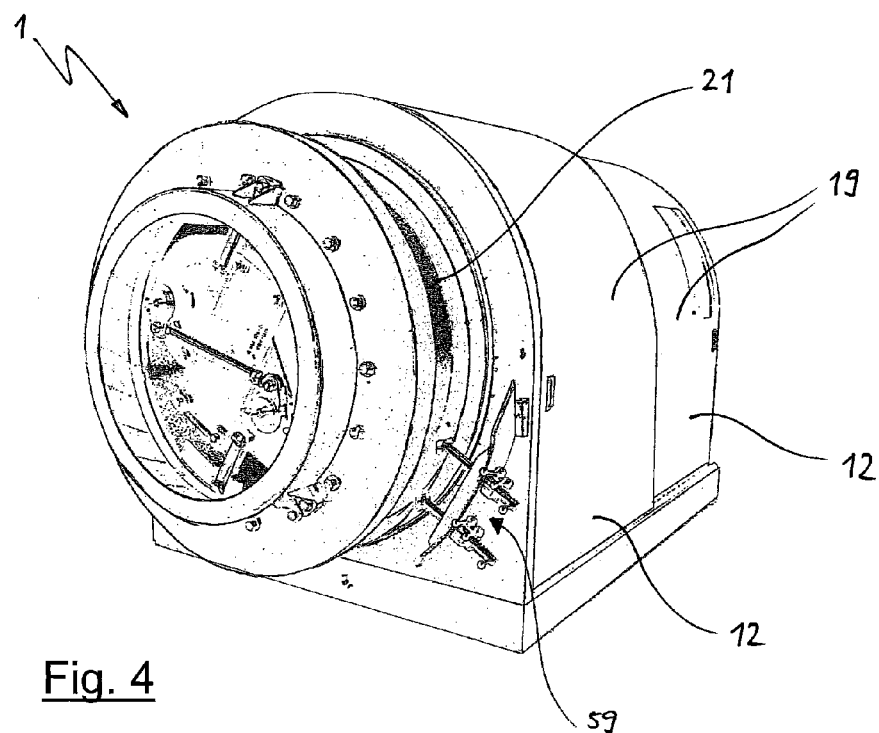
FIG. 4: shows a view of a further embodiment of a pellet press according to the invention with closed sliding doors.

FIG. 4 shows a view of a further embodiment of a pellet press 1 according to the invention, wherein the pellet press 1 has a cover 19. In the present case, the cover 19 consists substantially of sliding doors 12, which run on parallel rails so that they can be slid one over the other. In the exemplary embodiment shown, the rotating pressing mold 21 is not covered. Two knife holders 59 can be seen accordingly, each guiding a knife 55 (see FIG. 11) over the pressing mold 21 and thus cutting the pellets. It is conceivable, however, for the pressing unit also to be covered by sliding doors, which are similar to the sliding doors 12. Alternatively, the pressing tool may also be covered by a press door 20 (see FIGS. 3 and 10).

Figures 5A, 5B:
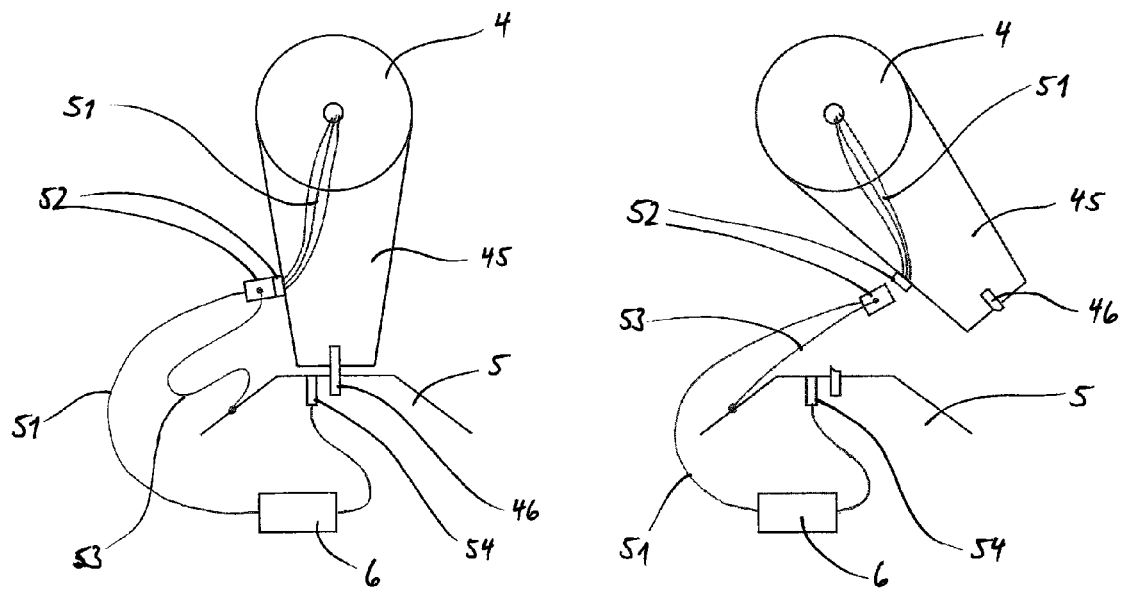
FIG. 5a: shows a first schematic illustration of an arrangement for safe shutdown.
FIG. 5b: shows a further schematic illustration of an arrangement for safe shutdown.

FIGS. 5a and 5b each show a schematic illustration of an arrangement for safe shutdown of an electric circuit. In this case, the circuit illustrated in a simplified manner consists of a control unit 6, an electrical connection between the control unit 6 or the machine and a sensor (not illustrated), which is arranged on a stationary shaft 4, and a plug connection. The stationary shaft 4 is connected to a base plate 5 of the machine via a shear pin lever 45 and a shear pin 46. In the event of a technical fault, the stationary shaft 4 may be subject to torque. If the torque exceeds a predetermined value, the shear pin 45 breaks and the shear pin lever 46 is deflected (see FIG. 5b). A detector 54 identifies the movement of the shear pin lever 46 and signals this to the control unit 6. This control unit 6 then switches the electrical connection 51 so as to be floating, so that there is no sparking when the plug connection 52 is disconnected. A pull-out cable 53 is fixed to the plug connection 52. This pull-out cable 53 is likewise attached rigidly to the base plate 5 or to the machine housing. The pull-out cable 53 is of such a length that when the shear pin lever 45 is deflected, there is still sufficient time to switch the electrical connection 51 so as to be floating before the pull-out cable 53 is stretched and disconnects the plug connection 52.

Figure 6A:
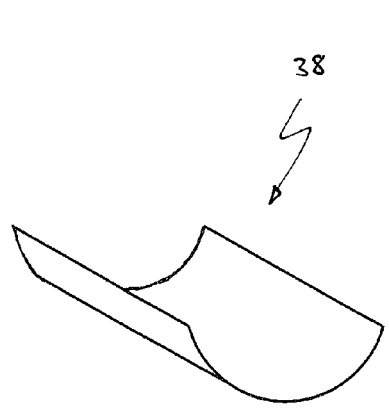
FIG. 6a: shows a schematic illustration of a feed chute according to the invention in a first embodiment.
Figure 6B:
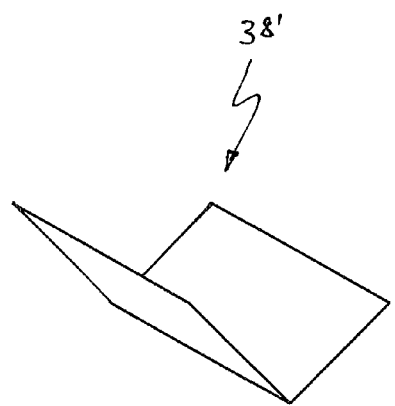
FIG. 6b: shows a schematic illustration of a further embodiment of a feed chute according to the invention.

FIGS. 6a and 6b each show a schematic illustration of a feed chute 38, 38' according to the invention in two different embodiments. The feed chute 38 focuses the material to be pelletized as a result of the trough-shaped convexity so that said material can be introduced selectively into the antechamber of a pellet press. The trough-shaped convexity of the feed chute 38 does not have any sharp bends in the trough. Similarly to the feed chute 38, the feed chute 38' also focuses the material to be pelletized. In this case however, the feed chute 38' deliberately has an approximately central sharp bend, so that optimal focusing is ensured, in particular with just a small feed flow.

Figure 7A:
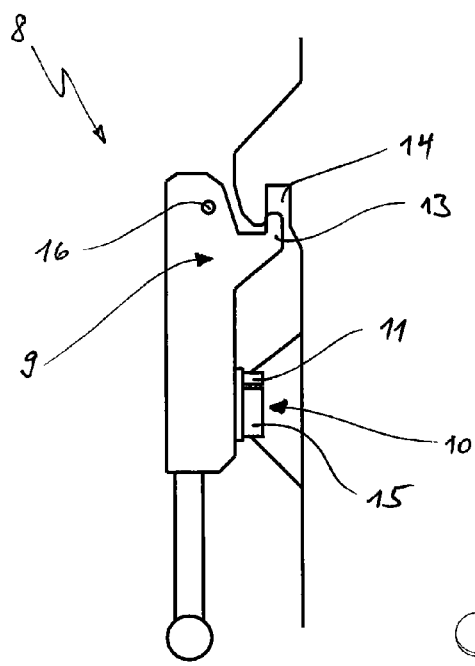
FIG. 7a: shows a schematic illustration of a door lock according to the invention.

FIG. 7a shows a schematic illustration of a door lock 8 according to the invention. The door lock 8 consists of a mechanical locking means 9 with a bolt 13 and an electric locking means 10 with an electromagnet 15. When the mechanical locking means 9 is closed, the bolt 13 engages in a recess 14 and thus locks a door, for example of a pellet press. When the pellet press is operated, the electric locking means 10 is then actuated and the electromagnet 15 fixes the mechanical locking means 9 in its closed position. Due to a suitable control unit, it can be ensured that the electromagnet 15 is only released when the motor or the shaft of the pellet press is still and the corresponding door can be opened safely. A detector 11, which is an integral component of the electric locking means 10, identifies the position of the mechanical locking means 9 so that the pellet press cannot be started if the door is closed incorrectly or if the mechanical locking means 9 is closed incorrectly.

Figure 7B:
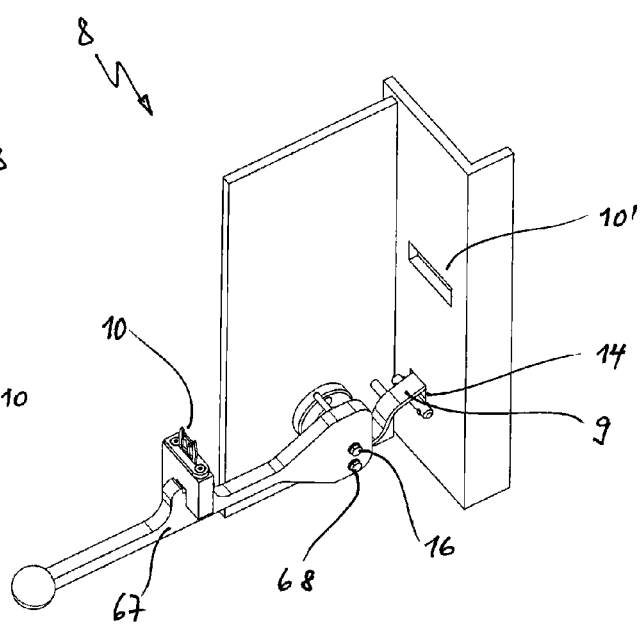
FIG. 7b: shows a view of a door lock according to the invention in a different embodiment.

FIG. 7b illustrates a view of a door lock 8 according to the invention in a different embodiment. The mechanical locking means 9 has a tenterhook, which engages, or can engage, an edge or a pin from behind in a recess 14. The tenterhook is fixed to a lever 67 at a driving pin 68. The driving pin 68 is arranged eccentrically to the swivel pin 16 of the lever 67 so that the tenterhook can be displaced by means of the driving pin 68 when the lever 67 is rotated and a door can be pulled accordingly into the closed position. Furthermore, part of an electromechanical locking means 10 is arranged on the lever 67 and corresponds to a corresponding counterpiece 10'. In the embodiment shown, the part of the electromechanical locking means 10 arranged on the lever 67 has a latching tab, which automatically latches in the corresponding counterpiece 10'. The counterpiece 10' is formed accordingly so that the locking means 10 automatically locks mechanically when engaged with the counterpiece. Only by applying a signal voltage can an electromagnet arranged in the counterpiece 10' release the mechanical lock and free the lever 67.

Figure 8:
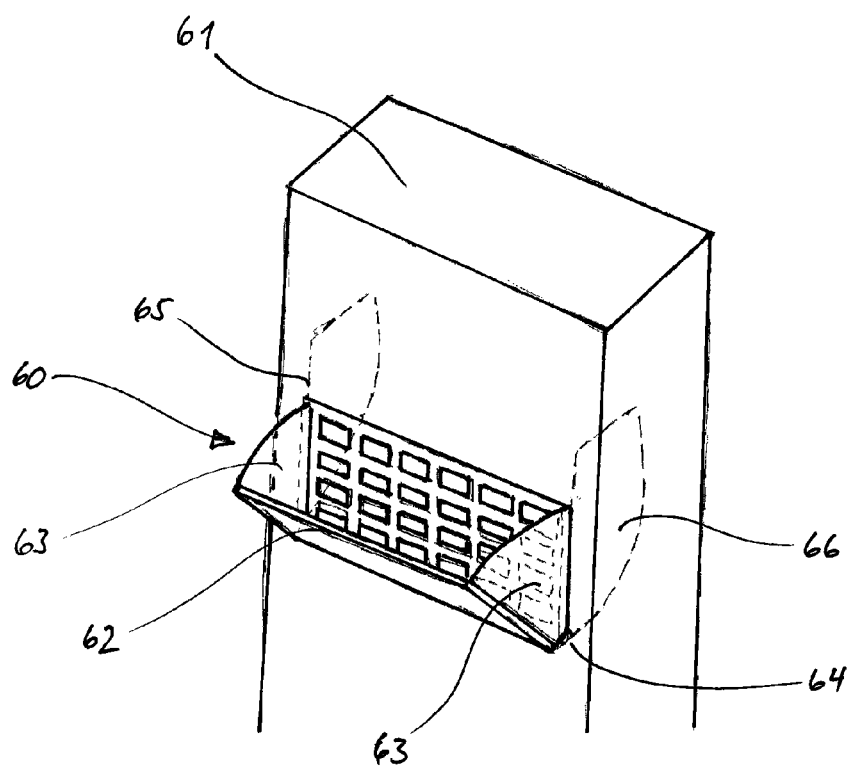
FIG. 8: shows a detailed view of a feed channel, with the focus on an inspection flap.

FIG. 8 illustrates a detailed view of a feed channel 61, with the focus on an inspection flap 60. The material to be pelletized is fed to the pellet press 1 through the feed channel 61 from a process arranged upstream of the pellet press 1 (see FIG. 4). In order to examine the quality of the fed material, an inspection flap 60 is provided in this feed channel 61. This inspection flap 60 allows access to an opening in the feed channel 61, wherein the opening is closed by a rough lattice for safety reasons, which ensures that there is no risk of injury to the operating staff by reaching into the feed channel 61. The inspection flap 60 basically has a front cover 62 and two side panels 63, which can be inserted into slits of corresponding design or directly into the opening of the feed channel 61. These side panels 63 have a notch 64 in their intended underside, close to the front cover 62, said notch being used as a hinge for the inspection flap 60. In order to prevent the inspection flap 60 from tipping out when the inspection flap 60 is opened, the side panels 63 have a stop 65, which is formed in the exemplary embodiment shown by enlarged side panel tabs 66. The weight and size of the two side panel tabs 66 is selected so that the inspection flap 60 is automatically closed again after opening. It can thus be ensured in a simple manner that no material, in particular dust, is discharged unnecessarily during operation through the opening in the feed channel 61 for the inspection flap 60 and that material to be pelletized is not contaminated by foreign materials.

Figures 9A, 9B, 9C:
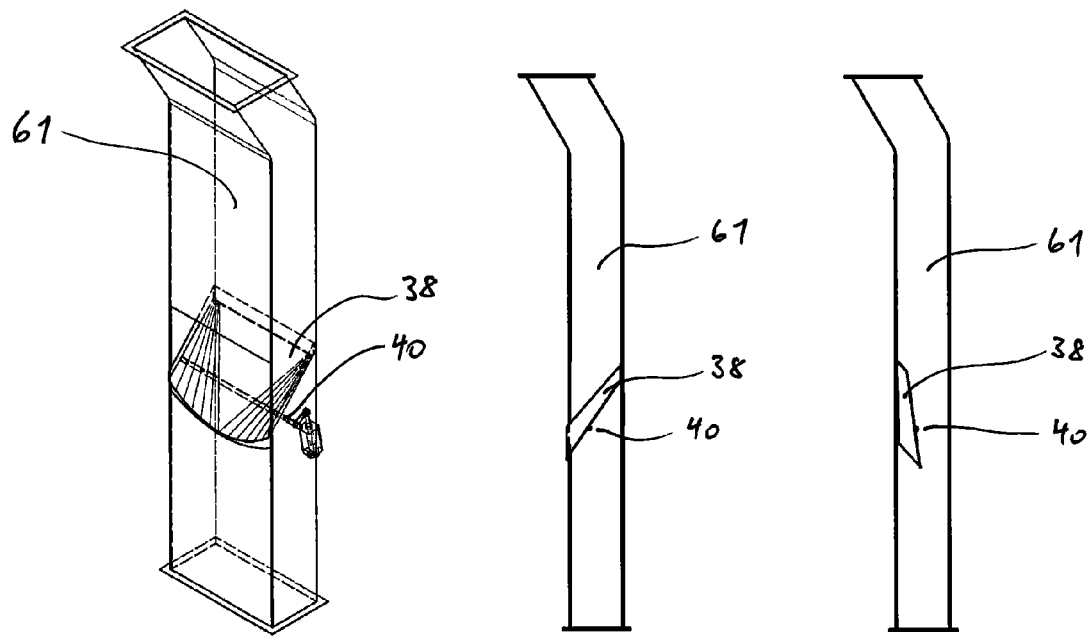
FIG. 9a: shows a view of a feed chute according to the invention arranged in a feed channel of a pellet press.
FIG. 9b: shows a cross section through the feed chute according to FIG. 9a, FIG. 9c: shows the cross section according to FIG. 9b, wherein the feed chute is located in a bypass position.

FIG. 9a shows a view of a feed chute 38 according to the invention arranged in a feed channel 61 of a pellet press 1 (see FIG. 4). The feed chute 38 is arranged in a first position such that the material to be pelletized, as already mentioned with reference to FIGS. 6a and 6b, can be introduced in a focused and selective manner into the antechamber 39 (see FIG. 3) of a pellet press 1. In the embodiment shown the feed channel 61 is not only guided as far as the antechamber 39 of the press, but continues past it. The feed chute 38 is arranged on a hinge joint 40, which allows the feed chute 38 to be pivoted from a first position as described above into a bypass position (see FIG. 9c). In this bypass position, the material to be pelletized is not guided into the antechamber 39 of the press, but can be guided past the pellet press via the continued feed channel 61. The feed chute 38 and the hinge joint 40 are designed or arranged such that the feed chute 38 closes the opening to the antechamber 39 of the press completely in the bypass position or at least closes it such that the material from the feed channel 61 is guided past this opening with as little obstruction as possible. Such a bypass circuit is advantageous in particular if the process upstream of the pellet press is a continuous process and the pellet press has to be decoupled from the material flow, for example to overcome problems or for servicing purposes.

FIGS. 9b and 9c show a cross section through the feed channel 61 according to FIG. 9a. In FIG. 9b, the feed chute 38 is illustrated in the first position, in which the material to be pelletized is guided into the antechamber 39 (see FIG. 3) of the press. The hinge joint 40 is suggested. In FIG. 9c, the feed chute 38 is pivoted about the hinge joint 40 and is located in the bypass position. The material from the feed channel 61 is guided past the pellet press.

Figure 10:
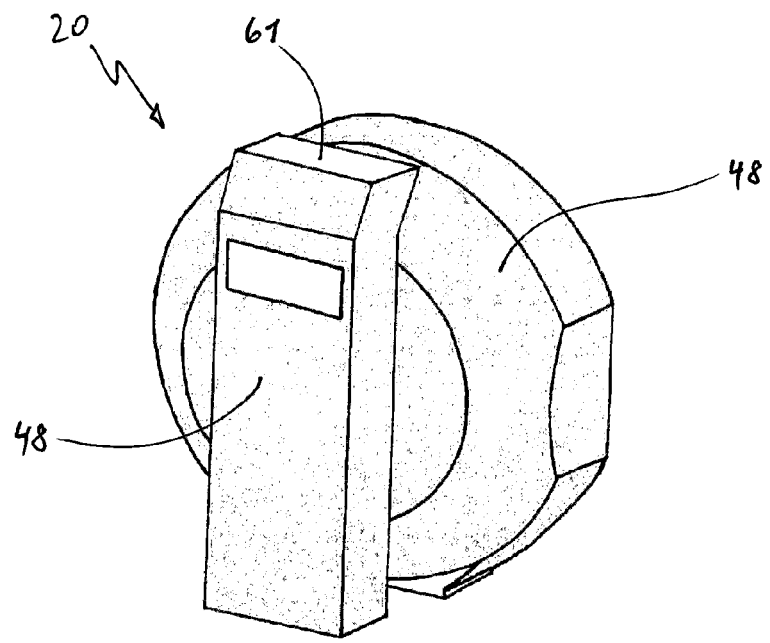
FIG. 10: shows a view of a press door of a pellet press.

FIG. 10 shows a view of a press door 20 of a pellet press. Normally during operation of a pellet press, in particular with cool ambient air, a condensate is formed on the press door 20, which tends to be cool. Such a condensate promotes the adhesion of dust particles, which are present inside the pellet press. Over relatively long periods of time, the pellet press may thus become highly contaminated, which at worst prevents correct functioning of the pellet press. It has been found that this formation of condensate can be easily prevented if the press door 20 is heated. To this end, heating mats 48 are arranged on the press door 20 and heat the press door 20 to a desired, adjustable temperature. Since experience has shown that condensate also forms in the feed channel 61, the feed channel 61 can also be provided accordingly with heating mats 48 or other heating elements so as to effectively prevent condensate formation.

Figures 11A, 11B:
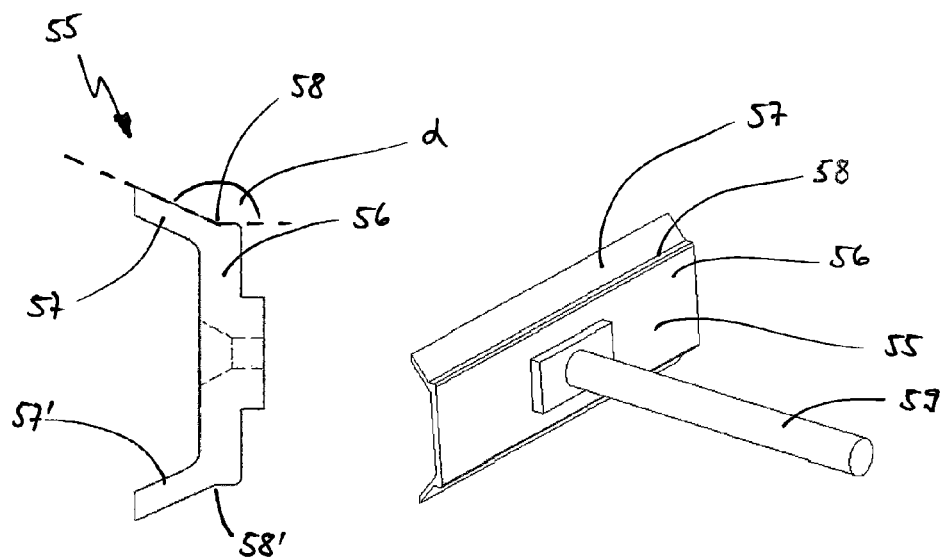
FIG. 11a: shows a cross section through a cutting knife according to the invention.
FIG. 11b: shows a view of the knife according to FIG. 11 with a knife holder.

FIGS. 11a and 11b illustrate a cutting knife 55 according to the invention, which is guided by knife holders 59 (see FIG. 4) over the outer face of the pressing mold 21 (see FIG. 4). The knife 55 has a knife base 56 and blades 57, 57' on either side, which use their cutting edge to cut off or break off the pellets upon exit from the pressing mold. Since it is difficult during operation to assess the wear of such knives 55, in particular of the blades 57, 57' thereof, the shown knives 55 have a wear indicator 58, 58' on each blade 57, 57'. As soon as the first blade 57 for example is worn as far as the wear indicator 58, the knife 55 has to be replaced or turned so that the cutting edge of the second blade 57' is used. The wear indicator 58, 58' is formed by an obtuse angle α of 140° between the blade 57, 57' and the knife base 56. A knife holder 59 is additionally indicated in FIG. 11b and allows the knife 55 to be fixed to the pellet press 1 (see FIG. 4).

Figure 12:
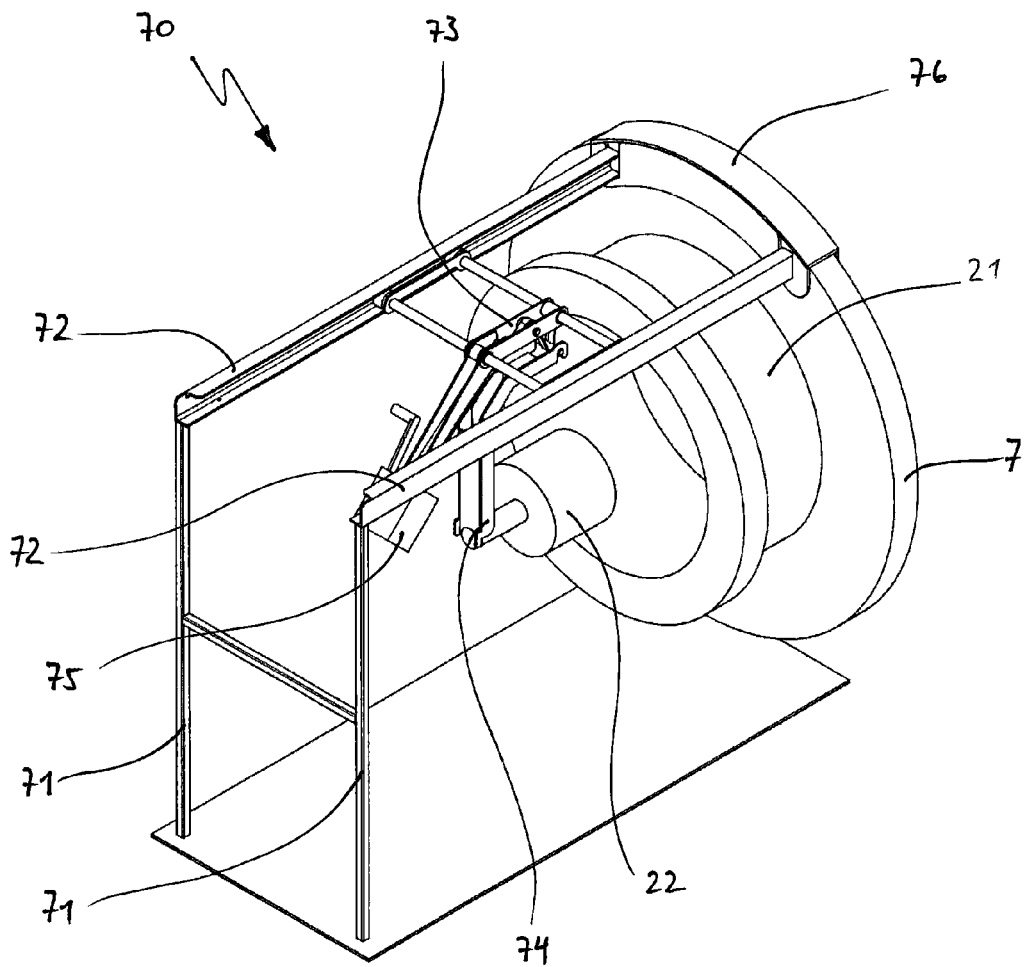
FIG. 12: shows a view of a device according to the invention for changing rolls and molds.

FIG. 12 shows a view of a device 70 according to the invention for replacing rolls and molds of a pellet press. Merely the front plate 7 and the pressing mold 21 of the pellet press are illustrated however. A pressing roll 22 is indicated. The device 70 comprises two support elements 71, two beams 72 and a support 76, which can be attached directly on the front plate 7 of the pellet press. A traveling crane 73 is arranged on both beams 72 and carries a load pick-up 74 via a chain hoist 75. The load pick-up 74 can be equipped with corresponding adapters so that this load pick-up 74 can receive both the pressing mold 21 and the pressing rolls 22. Due to the simple design of the device 70, the same device 70 can be used in a number of pellet presses. It goes without saying that the device 70 can also be used in other machines, for example if the support 76 is replaced accordingly.

The invention claimed is:

1. A direct drive pellet press comprising an electric motor having a motor rotor, the motor rotor is housed within a motor housing, the motor rotor being rotatably arranged within the motor housing so as to rotate about an axis,
   wherein the motor rotor is formed as a hollow shaft,
   a pressing unit having a pressing mold and pressing devices, and the pressing devices being arranged in said pressing mold,
   said pressing devices being fixed to a stationary shaft so as to prevent relative rotation between the pressing devices and the stationary shaft,
   the stationary shaft axially extending within said motor rotor,
   a mold holder being operatively connected to the pressing mold, and
   said mold holder having a first element of a spline connection and said motor rotor having a second element of the spline connection, the first element of the spline connection directly meshing with the second element of the spline connection so that a torque of the motor rotor is transferred from the motor rotor directly to the mold holder, wherein the second element of the spline connection is formed as toothing at an axial end of the motor rotor formed as the hollow shaft, and the first element of the spline connection is formed as toothing in the mold holder in a longitudinal direction, which meshes with the toothing of the motor rotor.

2. The pellet press as claimed in claim 1, wherein both of said first and said second elements of the spline connection comprise straight sided flanks, serration flanks or involute flanks.

3. The pellet press as claimed in claim 1, with a protective housing covering said pressing unit, wherein the protective housing has a sliding door.

4. The pellet press as claimed in claim 1 with a feed channel, wherein an inspection flap is arranged in the feed channel, said inspection flap comprising a front cover and two side panels, said side panels being insertable into correspondingly designed slits in the feed channel, wherein said side panels have side panel tabs, which prevent the inspection flap from falling out and are of a weight which causes the inspection flap to close independently.

5. The pellet press as claimed in claim 1 with the pressing mold and pressing rolls being arranged in a pressing chamber, wherein the motor is surrounded by a protective housing, wherein a pressure within the protective housing is greater than atmospheric pressure of a surrounding environment surrounding the protective housing.

6. The pellet press as claimed in claim 5 wherein said pressure within the protective housing is greater than a pressure in the pressing chamber of the pellet press.

7. The pellet press as claimed in claim 1, wherein the toothing of the motor rotor formed as the hollow shaft has straight sided flanks, serration flanks or involute flanks.

8. The pellet press as claimed in claim 1, further comprising an arrangement for safe shutdown of an electric circuit of the pellet press, said arrangement comprising
   a detector for detecting any abnormal movement of the stationary shaft,
   a control unit which receives a signal from the detector and subsequently switches an electrical connection in the electric circuit so as to be floating, and
   a device for disconnecting the electrical connection, wherein the device is designed such that the electrical connection is only disconnected after having been switched so as to be floating.

9. The pellet press as claimed in claim 1, further comprising a feed chute for feeding material to be pelletized to an antechamber of the pellet press, wherein at least an end region of said feed chute has a convexity transverse to a direction in which the material to be pelletized is intended to fall.

10. The pellet press as claimed in claim 1, further comprising a feed chute for feeding material to be pelletized into an antechamber of the pellet press through an opening, wherein the feed chute is arranged in a feed channel of the pellet press, wherein the feed chute is arranged on a hinge pivot so that the feed chute can be pivoted out of a first position and into a bypass position and, in the bypass position, the feed chute closes the opening such that the material from the feed channel bypasses this opening, and wherein the hinge pivot is arranged in a middle third of the feed chute.

11. The pellet press as claimed in claim 1, having a door and a door lock, said door lock comprising a mechanical locking means and an electromechanical locking means, wherein the mechanical locking means is blocked by the electromechanical locking means when the motor rotor turns.

12. The pellet press as claimed in claim 11, wherein the door lock comprises a detector for detecting a state of the mechanical locking means.

13. The pellet press as claimed in claim 11 wherein, when the mechanical locking means is not blocked by the electromechanical locking means, the motor is locked.

14. The pellet press as claimed in claim 1, further comprising a replaceable cutting knife, wherein the cutting knife has a knife base and at least one blade with a cutting edge, and wherein the blade has a wear indicator, which indicates a wear of the blade.

15. The pellet press as claimed in claim 1, wherein the stationary shaft is supported at a front end by a shaft bearing in the mold holder.

16. The pellet press as claimed in claim 1, wherein the spline connection allows co-axial engagement of the motor rotor and the mold holder.

17. A direct drive pellet press with a motor which has a motor housing and a motor rotor rotatably arranged therein,
wherein the motor rotor is formed as a hollow shaft and the motor housing concentrically surrounds the motor rotor, an axial end of the motor rotor is formed as a second element of a spline connection,
a pressing unit with a pressing mold,
pressing devices being arranged in the pressing mold,
the pressing devices being fixed to a stationary shaft,
the stationary shaft being arranged concentrically within the motor rotor and the motor housing so that the motor rotor is rotatably located between the motor housing and the stationary shaft,
a mold holder being operatively connected to the pressing mold, and having an end that is formed as a first element of the spline connection, and
the first element of the spline connection of the mold holder directly meshing with the second element of the spline connection of the motor rotor so that a torque of the motor rotor is transferred from the motor rotor directly to the mold holder during operation, wherein the second element of the spline connection is formed as toothing at an axial end of the motor rotor formed as the hollow shaft, and the first element of the spline connection is formed as toothing in the mold holder in a longitudinal direction, which meshes with the toothing of the motor rotor.

* * * * *